United States Patent
Belgaied et al.

(10) Patent No.: US 8,024,563 B1
(45) Date of Patent: Sep. 20, 2011

(54) PROGRAMMING INTERFACE FOR A KERNEL LEVEL SSL PROXY

(75) Inventors: Kais Belgaied, Sunnyvale, CA (US); Aleksandr Guzovskiy, Acton, MA (US); Bhargava K. Yenduri, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 1257 days.

(21) Appl. No.: 11/639,750

(22) Filed: Dec. 15, 2006

(51) Int. Cl.
*H04L 29/00* (2006.01)

(52) U.S. Cl. ......... 713/164; 713/165; 713/166; 713/167

(58) Field of Classification Search .................. 709/203; 713/164
See application file for complete search history.

(56) References Cited

U.S. PATENT DOCUMENTS

| 6,324,644 | B1 * | 11/2001 | Rakavy et al. | 713/1 |
| 2002/0174340 | A1 * | 11/2002 | Dick et al. | 713/178 |
| 2003/0046337 | A1 * | 3/2003 | Strahm et al. | 709/203 |
| 2003/0172167 | A1 * | 9/2003 | Judge et al. | 709/229 |
| 2008/0034417 | A1 * | 2/2008 | He et al. | 726/15 |

* cited by examiner

*Primary Examiner* — Nasser Moazzami
*Assistant Examiner* — Ghazal Shehni
(74) *Attorney, Agent, or Firm* — Marsh Fischmann & Breyfogle LLP; Karl A. Dierenbach; Kent A. Lembke

(57) ABSTRACT

A system for processing encrypted SSL sessions includes a web application, a secure sockets layer socket, a TCP/IP stack network layer device. The secure sockets layer socket is coupled between the web application and the TCP/IP stack network layer device. The system also includes an Ethernet device. The TCP/IP stack network layer device is coupled to the Ethernet device. The system also includes a SSL kernel, a kernel SSL interface coupled between the kernel SSL module and the TCP/IP stack network layer device and a crypto subsystem coupled to the kernel SSL module. A method for processing encrypted SSL sessions is also described.

12 Claims, 5 Drawing Sheets

PROGRAMMING INTERFACE FOR A KERNEL LEVEL SSL PROXY

BACKGROUND

The present invention relates generally to computer data transactions, and more particularly, to methods and systems for secure sockets layer data transactions.

Secure sockets layer (SSL) is a well known method and system for encrypting and decrypting data that can be exchanged between a first computer and a second computer. The SSL can thereby ensure the security and the integrity of the data exchanged between the first computer and the second computer. This is especially useful if the first computer and the second computer are connected via an unsecured data link (e.g., the Internet, wireless data link, etc.)

SUMMARY

Broadly speaking, the present invention fills these needs by providing an improved system and method for conducting secure sockets layer (SSL) transactions. It should be appreciated that the present invention can be implemented in numerous ways, including as a process, an apparatus, a system, computer readable media, or a device. Several inventive embodiments of the present invention are described below.

One embodiment provides a system for processing encrypted SSL sessions includes a web application, a secure sockets layer socket, a TCP/IP stack network layer device. The secure sockets layer socket is coupled between the web application and the TCP/IP stack network layer device. The system also includes an Ethernet device. The TCP/IP stack network layer device is coupled to the Ethernet device. The system also includes a kernel SSL module, a kernel SSL interface coupled between the kernel SSL module and the TCP/IP stack network layer device and a crypto subsystem coupled to the SSL kernel.

The NL7C device can include a network layer 7 cache. The kernel SSL module can include a SSL table and the SSL table can include multiple entries. Each of the entries can include a corresponding proxy port and one or more SSL parameter. Each of the entries can include a resumable SSL sessions entry. Each of the entries can include a server-generated SSL session identifier.

The kernel SSL module can also include logic for managing the SSL table. The kernel SSL module can also include logic for dynamically creating and deleting an SMF instance. The web application can be coupled to the logic for dynamically creating and deleting an SMF instance.

Another embodiment provides a system for processing encrypted SSL sessions including a web application, a secure sockets layer socket, a NL7C device wherein the secure sockets layer socket is coupled between the web application and the NL7C device. The NL7C device includes a network layer 7 cache. The system further includes an Ethernet device. The NL7C device is coupled to the Ethernet device. The system further includes a kernel SSL module, a kernel SSL interface coupled between the kernel SSL and the NL7C device and a crypto subsystem coupled to the kernel SSL module. The kernel SSL module includes a SSL table and the SSL table includes multiple entries. Each of the entries includes a corresponding proxy port and one or more SSL parameters. The kernel SSL module includes logic for managing the SSL table and logic for dynamically creating and deleting an SMF instance.

Yet another embodiment provides a method of establishing a SSL connection including binding a server to an address and an SSL port, retrieving one or more SSL parameters from a corresponding entry in a SSL table in a kernel SSL module, receiving an incoming connection on an SSL port, assigning a acceptor socket to the incoming connection, receiving a first packet, passing the first packet to the kernel SSL, kernel SSL module establishes larval SSL session and passes larval command and larval handle to a NL7C device and saving the larval command and larval handle to the NL7C device.

The method can also include receiving a subsequent packet and processing the subsequent packet. Processing the subsequent packet can include accumulating a complete SSL record in the kernel SSL module, retrieving key data, decrypting the complete SSL record to produce a cleartext content, returning the cleartext content to a NL7C device, parsing the cleartext content and delivering the cleartext content to a web application if the cleartext content is not present in a content cache. The method also includes receiving a cleartext response from the web application, retrieving a SSL context handle from a SSL socket, passing the SSL context handle and a cleartext message to kernel SSL module, encrypting the cleartext message and outputting an encrypted response.

The cleartext message can include the cleartext response, if the cleartext content is not present in the content cache. The cleartext message can include the cleartext content, if the cleartext content is present in the content cache.

The method can also include receiving an indication to close TCP connection in the NL7C device and outputting a close_notify message from the NL7C device.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

DETAILED DESCRIPTION

Several exemplary embodiments for an improved system and method for conducting secure sockets layer (SSL) transactions will now be described. It will be apparent to those skilled in the art that the present invention may be practiced without some or all of the specific details set forth herein.

As described above, the secure sockets layer (SSL) can provide secure data transmission between two computers even though the two computers are linked by an unsecured data link. By way of example, the first computer may be a server supporting a web serving application. The second computer can be a customer's computer linked to the first computer via the Internet or other unsecured network connection. The web serving application can include a sales portion (e.g., a shopping cart). When the customer selects items to purchase via the web serving application, the shopping cart can implement a secure session with SSL. The SSL encrypts and decrypts the financial data transferred between the first computer and the second computer.

The application on the first computer (e.g., the web serving application) calls a SSL library to initiate the secure session. The application then works with the SSL library to establish a session with the first computer. Establishing the session with the first computer can include numerous data exchanges between the first computer and the second computer (e.g., requesting the session, exchanging certificates, selecting the encryption protocols, etc.).

Figure 1:
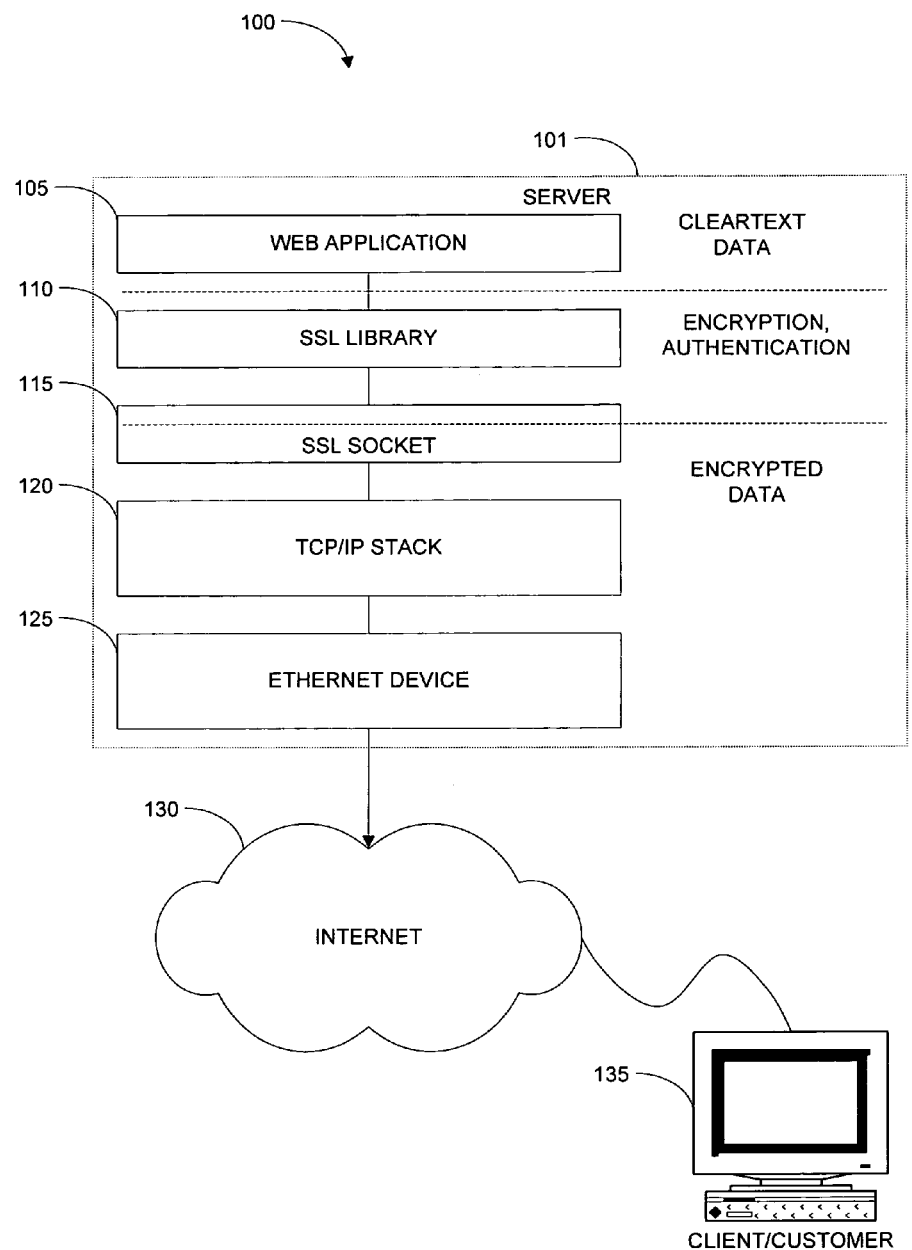
FIG. 1 is a block diagram of a SSL system, in accordance with an embodiment of the present invention

FIG. 1 is a block diagram of a SSL system 100, in accordance with an embodiment of the present invention. A web application 105 communicates clear text (i.e., non-encrypted) data to a SSL library 110 and an SSL socket 115. The SSL library 110 and the SSL socket 115 encrypt the clear text data. A TCP/IP stack 120 is added to the encrypted data so that the Ethernet device 125 can communicate the TCP/IP packetized, encrypted data across the Internet 130 (or other non-secure network) to a client of customer computer 135.

This use of SSL-protected webserver model follows a full implementation of the SSL protocol. The SSL Library 110 (e.g., NSS/NSPR for the JES Webserver, OpenSSL's libssl for Apache and Zeus or other SSL libraries). This approach has a few performance penalties. First, the benefits from using secure hardware storage of private keys and from the hardware acceleration of the costly cryptographic operations are diminished by the extra system calls, and possible multiple library layers. Second, the SSL library 110 must process control messages (e.g., Alert, Handshake, Change Cipher-Spec, etc.). A simple https transaction typically requires exchanging nine or more control messages including, for example: eight handshakes and at least one change Cipher-Spec to setup the connection, two application data messages (e.g., HTTP GET and the receiver's response) and two r more alert messages (e.g., server's close notify and the reply). Only the application data messages carry a Payload useful for the application. The remaining transactions are protocol overhead. Third, content caching is disabled. A 2-3× performance boost can be gained by caching and improved system calls.

Figure 2:
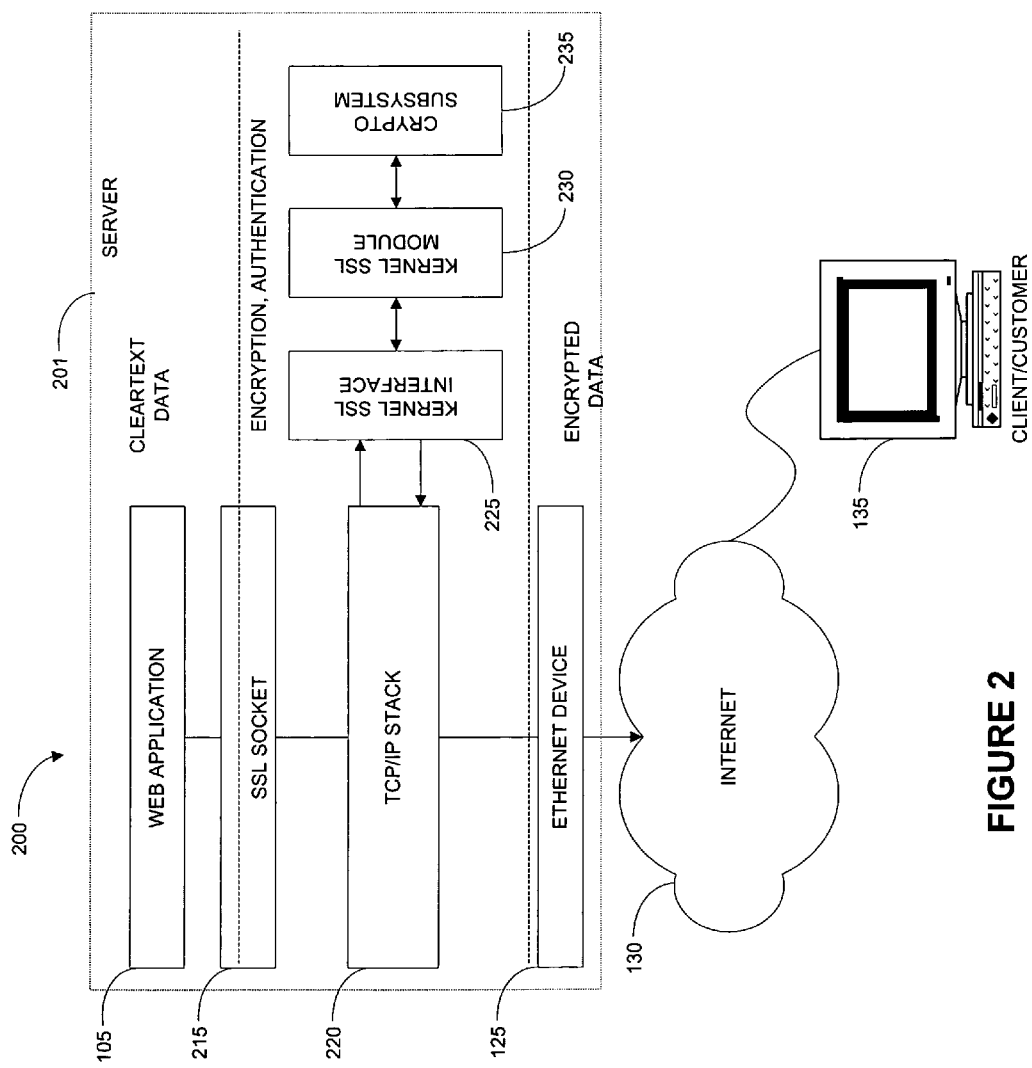
FIG. 2 is a block diagram of a system for processing encrypted SSL sessions, in accordance with an embodiment of the present invention.

FIG. 2 is a block diagram of a system 200 for processing encrypted SSL sessions, in accordance with an embodiment of the present invention. The system for 200 includes a server 201. The server 201 includes a web application 105, a SSL socket 215, a network layer device 220 that provides a TCP/IP stack (hereafter TCP/IP stack device 220) and an Ethernet device 125. The Ethernet device 125 provides a network connection to the world external to the server 201 (e.g., the Internet 130 and one or more client computers 135). The server 201 also includes a kernel SSL interface 225, a SSL kernel module 230 and a crypto subsystem 235 that are coupled to the TCP/IP stack device 220. The kernel SSL interface 225, the SSL kernel module 230 and the crypto subsystem 235 work with the TCP/IP stack device 220 and the SSL socket 215 to support SSL sessions between the web application 105 and the client computer 135. The kernel SSL interface 225 provides an interface, defined by the set of functions and data structures, between the TCP/IP stack device 220 and the SSL kernel module 230. The SSL kernel module 230 includes the kernel level implementation of the SSL protocol. The contents and functions of the kernel SSL interface 225, the SSL kernel module 230 and the crypto subsystem 235 are described in more detail below.

Figure 3:
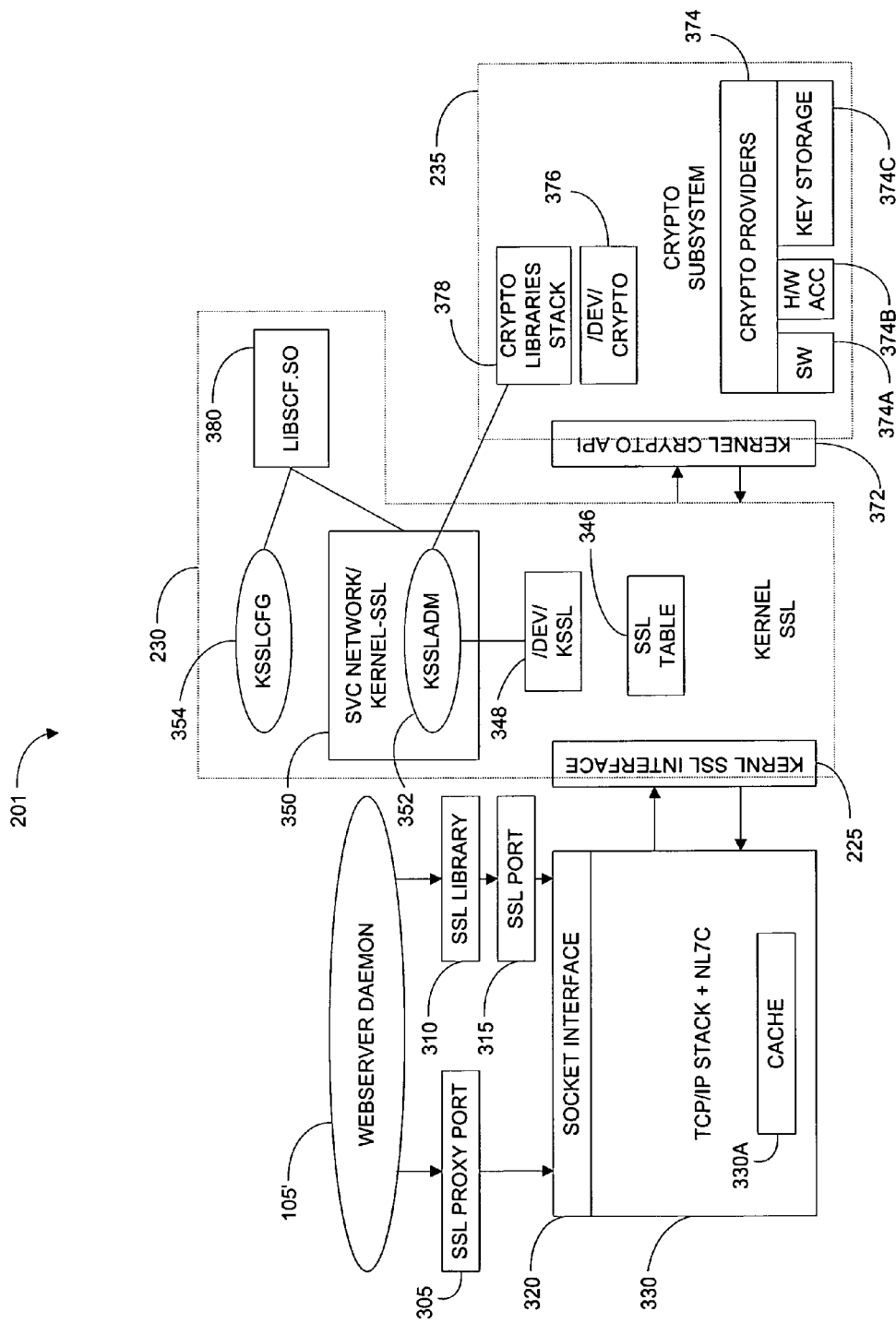
FIG. 3 is a block diagram of a portion of a server, in accordance with an embodiment of the present invention.

FIG. 3 is a block diagram of a portion of a server 201, in accordance with an embodiment of the present invention. A web server daemon 105' is a web application that can use a kernel SSL proxy. The SSL proxy port 305 is an entity that adds SSL protection for an application such as the web server daemon 105'. The SSL proxy port 305 is interposed between the application and the network. The web server daemon 105' communicates clear text (i.e., non-encrypted) data to a SSL library 310 and a socket interface 320 by way of a SSL port 315. The SSL library 310 and the SSL socket 315 encrypt the clear text data. The SSL proxy, exchanges cleartext data from the application and SSL records with the peer across the network. The SSL proxy port 305 is a TCP port number for cleartext communication between the SSL proxy and the application (e.g. HTTP Port 80.). The SSL port 315 is a TCP port number for SSL-protected communication between the SSL proxy and the peer (e.g. HTTPS port 443).

A network layer TCP/IP stack and NL7C device 330 (hereafter NL7C 330) adds a TCP/IP stack the encrypted data. A network layer 7 cache (NL7C) is a set of components of the TCP/IP stack and the sockets in a Solaris that allow the serving application layers from the Solaris kernel. NL7C is a type of Network Cache Accelerator (NCA) integrated with the TCP/IP stack.

The kernel SSL (kssl) module 230 includes a loadable kernel module 350 that interfaces the NL7C 330 and is responsible for the SSL processing on incoming and outgoing packets. The kernel SSL table 346 is a mapping table in the kssl module 230 that stores the proxy port and SSL parameters (e.g., certificates, private key locator, cipher suites, etc.) for each entry (SSL_port, incoming address).

Figure 4:
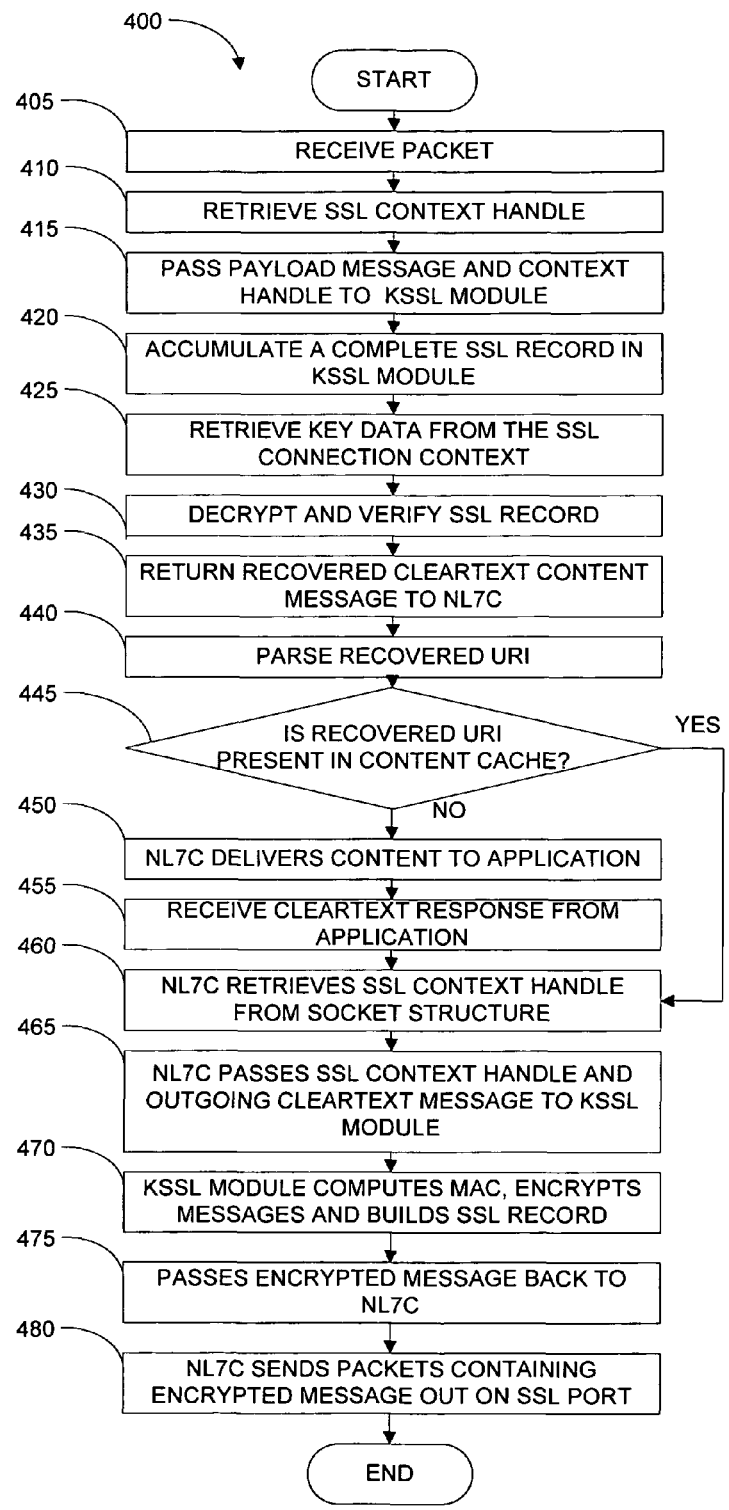
FIG. 4 is a flowchart of the method operations of processing an SSL session, in accordance with an embodiment of the present invention.

FIG. 4 is a flowchart of the method operations of processing an SSL session 400, in accordance with an embodiment of the present invention. When an SSL connection is established with the remote client, and the SSL port acceptor socket structure (the sonode struct) was updated with an opaque reference to the SSL context structure, then the SSL context structure has the key materials, the initialized encryption states, and the cipher specifications negotiated for the connection. The NL7C 330 has an acceptor socket for the proxy port 305.

In an operation 405, a packet arrives on the SSL port 315 and in an operation 410, the NL7C code in the NL7C 330 retrieves the SSL context handle from the receiving socket structure. In an operation 415, the NL7C code in the NL7C 330 passes the TCP payload message and the context handle to the kssl module 230.

In an operation 420, the kssl module 230 accumulates incoming messages in the context structure up to a complete SSL record. In an operation 425, the kssl module 230 retrieves key data from the SSL connection context and in operation 430, decrypts and verifies the SSL record. The recovered cleartext content message is returned to NL7C 330 in an operation 435.

In an operation 440, the NL7C 330 parses the recovered uniform resource locator (URI) and in an operation 445 the content cache is searched to determine if the recovered URI is present in the content cache. The URI is a compact string of characters used to identify or name a resource. The URI enables interaction with representations of the resource over a network (e.g., Internet, World Wide Web, or other network) using specific protocols. If, in operation 445, the recovered URI is present in the content cache, the method operations continue in an operation 460 below. If in operation 445, the recovered URI is not present in the content cache, the method operations continue in an operation 450.

In operation 450, the NL7C 330 delivers the content to the application 105' on the proxy port 305. Alternatively, the NL7C 330 can deliver the content to the application by notifying the application 105' waiting on a poll/select node.

In an operation 455, a reply is returned from the application 105' to the proxy port 305. The NL7C 330 can maintain a copy of the reply in its cache 330A. In operation 460, the NL7C 305 retrieves the SSL context handle from the socket structure and passes it along with the outgoing cleartext message to kssl module 230 in an operation 465. The outgoing cleartext message can include the cleartext content or the cleartext response from the application 105', as may apply as determined in operation 445 above.

Figure 5:
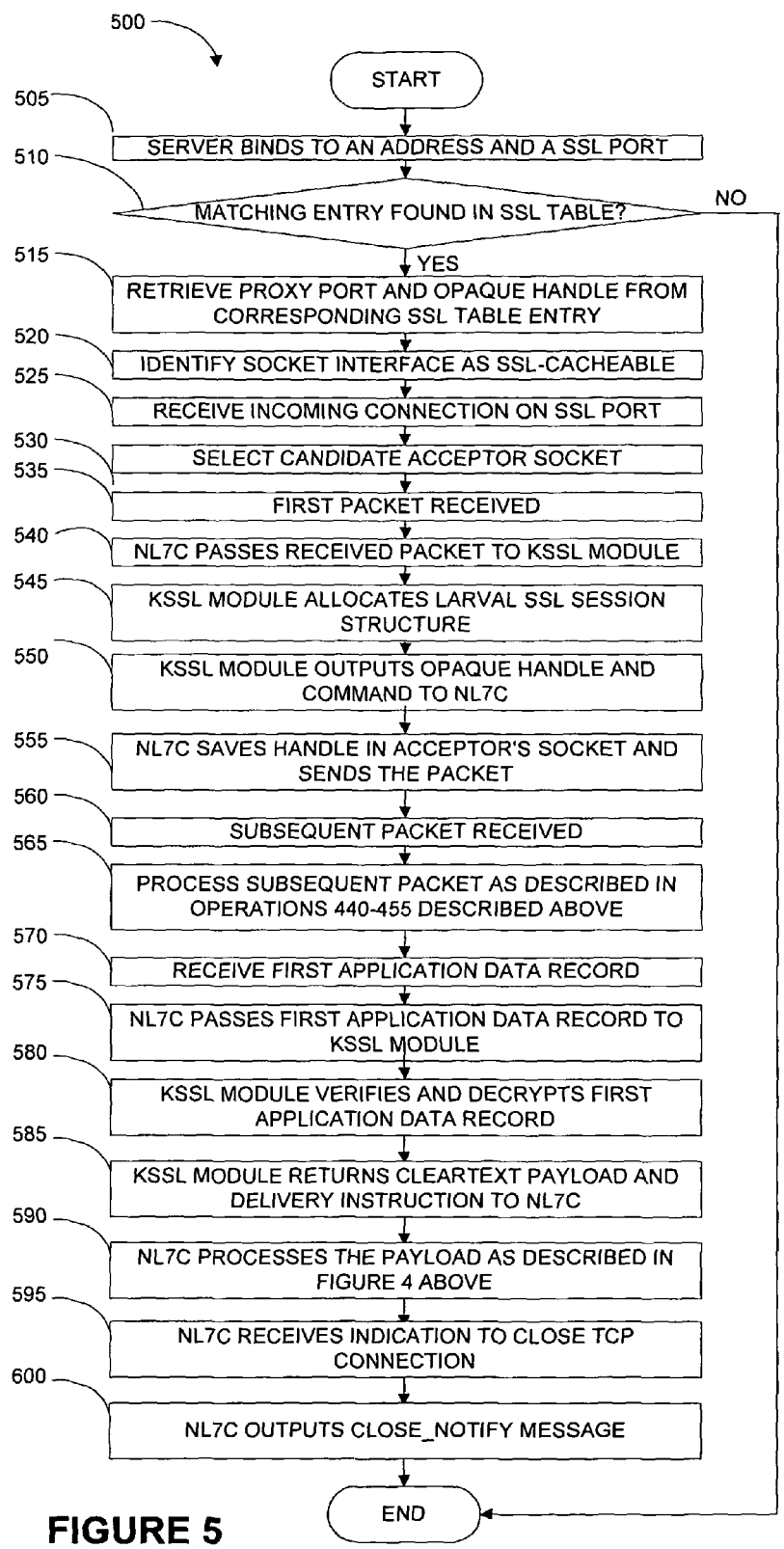
FIG. 5 is a flowchart of the method operations of establishing a new connection, in accordance with an embodiment of the present invention.

In an operation 470, the kssl module 230 computes the MAC, encrypts the messages and builds the SSL record. In an operation 475, the kssl module 230 passes the encrypted message back to the NL7C 330. In an operation 480, the NL7C 330 sends the packet out on the SSL port 315 and the method operations can end FIG. 5 is a flowchart of the method operations of establishing a new connection 500, in accordance with an embodiment of the present invention. The web server 105' can be configured with two listener sockets. A first socket listening on the SSL port 315, and is listening for SSL records (e.g., HTTPS packets). The second socket is listening on the SSL proxy port 305, and is listening for cleartext HTTP packets. In an operation 505, the server binds to an address and SSL port.

In an operation 510, the socket bind code calls a kssl entry point to examine the SSL table 346 for a matching entry. If a matching entry is found, then the proxy port 305 and an opaque handle (kssl_ent) to the corresponding entry is returned in an operation 515. The handle is expected back in later calls from the stack 330.

In an operation 520, the socket interface 320 is flagged as an "SSL-cacheable" socket, so that incoming packets later arriving on acceptors from that socket are first re-routed for SSL processing.

In an operation 525, an incoming connection is received on the SSL port 315 and establishes the TCP client state. A candidate acceptor socket is selected to take over the connection in an operation 530. The candidate acceptor socket inherits the "SSL-cacheable" flag from the bind/listener socket, as well as the kssl_ent and the proxy port. The application 105' doesn't get any notification on the proxy port yet. Specifically, no accept( ) or poll( ) or select( ) system call returns yet are sent to the application 105'.

In an operation 535, a first packet arrives (typically a ClientHello SSL Handshake message). In an operation 540, the NL7C 330 passes it to the kssl module 230, along with the kssl_ent handle and a storage location to receive an opaque handle for an SSL connection context.

In an operation 545, the kssl module 230 allocates a larval SSL session structure. In an operation 550, the kssl returns an opaque handle to the kssl_ctx, a packet carrying the (ServerHello, ServerCertificate, ServerHelloDone) response, and a command telling the TCP/IP stack 330 to send the new packet back on the SSL port TCP client.

In an operation 555, the NL7C 330 saves the kssl_ctx handle in the acceptor's socket, and sends the packet as instructed. The application 105' is still undisturbed.

In an operation 560, a next handshake packet or packets arrive on the SSL port 315. The next handshake packets are re-routed to the SSL entry point, with the kssl_ctx handle, and the corresponding reply is sent by the NL7C 330 as described in operations 440-455 of FIG. 4 above. The operations continue iteratively until the handshake is completed and the SSL client is ready to send application data in an operation 565.

In an operation 570, the first application data record arrives on the SSL port 315. The NL7C 330 passes the first application data record to the kssl module 230 in an operation 575. The kssl module 230 verifies and decrypts the first application data record in an operation 580. In an operation 585, the kssl module 230 returns the cleartext payload to the NL7C 330 with a command instructing the stack to deliver the packet to the proxy port 305.

In an operation 590, the stack 330 can wake up an acceptor thread, notify a blocking select( )/poll( ), or, if enabled, parse the first application data and process it from the kernel cache, as described in FIG. 4 above.

In an operation 595, the NL7C 330 can receive an indication for closing the TCP connection, either from the sockfs, or from the peer (FIN or RST) TCP client. When the indication for closing the TCP connection is received, the NL7C 330 calls a kssl entry point to dismantle the SSL context. If the indication for closing the TCP connection occurs on a fully established SSL connection, then the kssl module 230 will reply with a close_notify message to be sent to the peer in an operation 600. The kssl module 230 can also initiate the closing of a socket, by calling a new event notification routine from the NL7C 330. The kssl module 230 can initiate the closing of a socket in two cases: when a fatal alert SSL message is received, or when the kssl module 230 had to generate and send a fatal alert SSL message, because of a problem during the handling of an incoming message (bad_record_mac, decryption_failed. Unexpected_message, etc.).

The kssl module 230 includes a cache of the resumable SSL sessions entries in the SSL table 346. Each entry is uniquely identified by a server generated SSL session identifier (session_id). Session resumption is accomplished using the session_id field of the ClientHello and SeverHello messages. When the client specifies a non-zero session-id used as a request to resume that session. That is to use the shared secret (master secret) already established in that session and thereby skipping the RSA encryption by the client of a pre-master-secret, the decryption by the server, and the derivation of the master secret from the pre-master. Entries remain in the SSL table 346 until they expire, or until a fatal alert is received for a connection that uses that session's master secret. A timeout can also be a tunable per instance of the kssl service. The size of the SSL table 346 for each instance can be varied. By way of example, tests have shown that a default of about 5000 entries in the SSL table 346 can be a reasonable initial or default size for the SSL table. It should be understood that other sizes small or larger than 5000 entries could also be used for the SSL table 346.

The crypto subsystem 235 includes components needed to perform the actual encryption and decryption processes. The crypto subsystem 235 components include the kernel crypto API which couples the data to and from the kernel SSL 230. The components also include the crypto providers 374. The crypto providers 374 include one or more crypto software 374A, hardware and accelerator(s) 374B and one or more key storage 374c locations. The hardware accelerators can include one or more hardwired cryptographic processes so that the cryptographic processes can be executed faster than a software type cryptographic processes. The key storage 374C provides storage space for storing keys and certificates needed for performing the cryptographic processes. The crypto subsystem 235 components also include the crypto libraries stack 378 and the dev crypto 376. The crypto libraries stack 378 and the dev crypto 376 are used by the crypto subsystem 235 and the kernel SSL 230.

A dynamic reconfiguration out of the last provider for a cryptographic functionality that the kssl code needs can cause the function calls for that functionality to fail, and causing the SSL kernel code to tear down the victim sessions and connections. The handling of HTTPS packets will fallback to the webserver. Further, the kssl module 230 can sign up with the kernel crypto framework's providers 374-374C notification, passing a callback function to be called when any provider it needs is removed or added. The callback function can remove the kssl ent SSL table 346 entries that are affected by the removal of the cryptographic providers 374-374C.

Kssl module 230 accesses the server's certificates and private keys to perform SSL. Kssl module stores the certificates and keys and other SSL parameters in the SSL table 346. There is one entry for each server instance, and the entry is keyed by the server's address, port. The fields of each table entry (kssl_ent) include the certificate, the private key, the sorted list of cipher suites that a client is allowed to negotiate, the SSL proxy port, and the sessions' timeout value.

The kssl service can be greenline-compliant. One embodiment defines a new transient service: svc:network/kernel-SSL. There is a 1:1:1 mapping between 1 instance of a web server that uses NL7C+kssl, 1 instance of the kernel-SSL FMRI, and 1 entry in the SSL table 346. The SSL parameters are persistently stored in a service management facility (SMF) repository. The SMF repository is an infrastructure for running services, defining dependency relationships between different services and storing and managing persistent configuration information about the services. The SSL parameters are represented by SMF properties of the kernel-SSL instance. The enable method of the instance gets the values of the parameter properties, and passes them to /dev/kssl 348.

Two closely related command-line programs are included in the kernel SSL 230. The first program, kssladm 352, is a private command that manages the SSL table 346 by making ioctl( ) calls into the /dev/kssl 348. The corresponding "create" subcommand reads the certificate and the private key from the specified location and issues the ioctl( ) to create an entry in the SSL table 346. The "delete" subcommand will issue the ioctl( ) to delete an entry in the SSL table 346. The kssladm(1M) 352 is not intended to be used by the end user. The kssladm(1M) 352 is executed by the enable/disable/refresh methods of the kernel-SSL FMRI instances, via the SMF.

The second program is ksslcfg(1M) 354, which is run by the web server administrator to dynamically create/delete an SMF instance of kernel-SSL. The ksslcfg 354 also has "create" and "delete" subcommands. The "create" subcommand of the ksslcfg 354 takes a set of parameters that SMF will need to run the kssladm 352 as command-line arguments each time the service instance is enabled. The create subcommand of the ksslcfg 354 creates the SMF instance, and attempts to enable the new instance. The "delete" subcommand stops the service and deletes the instance from the SMF repository. The ksslcfg 354 and the kssladm 352 are also coupled to a library (libscf.so) 380 that can be used to instantiate the ksslcfg and the kssladm.

A webserver administrator will typically call ksslcfg(1M) 354 only once, when installing the webserver 105' and enabling it for the NL7C 330 and kernel SSL acceleration. The webserver administrator will create an instance of the kernel-SSL service that stores the configuration information persistently in the SMF repository, and defines the enable/disable/refresh method. The SMF will call the enable method (thus kssladm(1M) 352) each time the kernel SSL module 230 is enabled.

ksslcfg(1M) 354 and kssladm(1M) 352 support three formats for reading certificates and keys from: PKCS#11 key store, PKCS#12 and PEM files. If the private key is encrypted, the user provides a file that stores the password. These arguments are supposed to be already known to the webserver 105' regardless the use of NL7C+kssl. Unless the webserver 105' is started by root, the administrator provides the username of the webserver user who has read access to the password file and the private key file to ksslcfg 354 so that SMF will invoke kssladm 352 as the user.

The syntax of the two commands are almost identical as the job of ksslcfg 354 is to pass the information needed by kssladm 352 to SMF. The only one difference is that "ksslcfg add" has one extra option "-u<username>" to specify the user that kssladm 352 should be run by.

Configuring the webserver to use NL7C 330 with both the SSL port 315 and the SSL proxy port 305. This is done by adding an entry for each in /etc/nca/ncaport.conf and running the ksslcfg(1M) 354 to create and enable a new instance of kernel-SSL 350.

Credentials of the enable and disable methods of the kernel-SSL FMRI instances: The enable method of a kernel-SSL FMRI instance accesses the password file that decrypts the private key file. It is executed with the UID that has that access, ksslcfg(1M) 354 creates the kernel-SSL 350 instance with an 'enable' method to be run as that UID which is the user attribute of the method's method_credential. The enable and disable methods invoke kssladm(1M) 352 which issues a privileged ioctls, that require the sys_net_config privilege. Consequently, the privileges attribute of those methods' method credential is equal to sys_net_config.

The ksslcfg(1M) 354 also has write access to the system (or zone) repository, owned by the root. An entry is added to the Network Security exec profile that lists ksslcfg(1M) 354 with a euid=0. A webserver administrator is assigned that profile to be able to run ksslcfg(1M) 354.

The NL7C 330 is modified to guarantee that no cleartext HTTP packets will be exchanged with outside clients. Communication across the sockets bound to the proxy port is reserved exclusively to the NL7C 330 and the kssl module 230. By way of example a website can have a policy of "No Cleartext packets allowed", that can be supported. Such a webserver that wants both cleartext HTTP, and encrypted HTTPS will need 3 ports: 1 SSL port, 1 private SSL proxy port, and one exposed HTTP port.

The NL7C code in the NL7C 330 is the only code currently invoking the kssl kernel entry points and is ready for global zone only, most of the kernel SSL is stateless thus zones-friendly. The persistent kssl configuration information is kept in the SMF services repository, which is already per-zone. The ksslcfg(1M) 354 can be run in a local zone and will create an instance of the kernel-SSL 350 service in that zone's services database. The kernel SSL table 346 is shared, however there is an entry per instance. There is also a session cache per instance. The zone separation is maintained as long as instances from the local zones aren't created with wildcard server addresses. Full zones support for both NL7C and NL7C with SSL can also be supported. The kssl module 230 can use keys-by-value. The kssl module 230 can use sensitive PKCS#11 private keys, relying on kssladm(1M) 352 for unwrapping them first.

SSL off-loaders provider interface allows offloading to next generation SSL protocol accelerators at multiple levels of service. By way of example record only offloading, full handshake termination and bump-in-the stack offloading.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in the above figures are not required to be performed in the order illustrated, and that all the processing represented by the operations may not be necessary to practice the invention. Further, the processes described in any of the above figures can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system for processing encrypted SSL sessions comprising:
   a web application;
   a secure sockets layer socket;
   a network layer (NL7C) device wherein the secure sockets layer socket is coupled between the web application and the NL7C device;
   an Ethernet device, wherein the NL7C device is coupled to the Ethernet device;
   a kernel SSL module;
   a kernel SSL interface coupled between the kernel SSL module and the NL7C device; and
   a crypto subsystem coupled to the kernel SSL module, wherein the kernel SSL module is adapted to accumulate a complete SSL record and the crypto subsystem is adapted to decrypt the complete SSL record to produce a cleartext content,
   wherein the system is configured such that, if the cleartext content is not present in the NL7C device, the system delivers the cleartext content to the web application and an outgoing cleartext message is produced based on a cleartext response from the web application,
   wherein the system is configured such that, if the cleartext content is present in the NL7C device, an outgoing cleartext message is produced based on the cleartext content present in the NL7C device.

2. The system of claim 1, wherein the NL7C device includes a network layer 7 cache.

3. The system of claim 1, wherein the kernel SSL module includes a SSL table and wherein the SSL table includes a plurality of entries and wherein each of the plurality of entries includes a corresponding proxy port and one or more SSL parameter.

4. The system of claim 3, wherein each of the plurality of entries includes a resumable SSL sessions entry.

5. The system of claim 4, wherein each of the plurality of entries includes a server-generated SSL session identifier.

6. The system of claim 3, wherein the kernel SSL module includes logic for managing the SSL table.

7. The system of claim 1, wherein the kernel SSL module includes logic for dynamically creating and deleting an SMF instance.

8. The system of claim 7, wherein the web application is coupled to the logic for dynamically creating and deleting an SMF instance.

9. The system of claim 1, wherein the kernel SSL module, the SSL interface, and the crypto subsystem are each free of a direct coupling to the web application.

10. A system for processing encrypted SSL sessions comprising:
    a web application;
    a secure sockets layer socket;
    a NL7C device wherein the secure sockets layer socket is coupled between the web application and the NL7C device, wherein the NL7C device includes a network layer 7 cache;
    an Ethernet device, wherein the NL7C device is coupled to the Ethernet device;
    a kernel SSL module;
    a kernel SSL interface coupled between the kernel SSL module and the TCP/IP stack network layer device; and
    a crypto subsystem coupled to the kernel SSL module, wherein the kernel SSL module includes a SSL table and wherein the SSL table includes a plurality of entries and wherein each of the plurality of entries includes a corresponding proxy port and one or more SSL parameter, and wherein the kernel SSL module includes logic for managing the SSL table, and wherein the kernel SSL module includes logic for dynamically creating and deleting an SMF instance, wherein the kernel SSL module accumulates a complete SSL record and the crypto subsystem decrypts the complete SSL record to produce a cleartext content,
    wherein, if the cleartext content is not present in the NL7C device, the system delivers the cleartext content to the web application.

11. A method of establishing a SSL connection comprising:
    binding a server to an address and an SSL port;
    retrieving one or more SSL parameters from a corresponding entry in a SSL table in a kernel SSL module;
    receiving an incoming connection on an SSL port;
    assigning a acceptor socket to the incoming connection;
    receiving a first packet;
    passing the first packet to the kernel SSL module;
    kernel SSL module establishes larval SSL session and passes larval command and larval handle to a NL7C device;
    saving the larval command and larval handle to the NL7C device;
    receiving a subsequent packet; and processing the subsequent packet, wherein processing the subsequent packet includes:
   accumulating a complete SSL record in the kernel SSL module;
   decrypting the complete SSL record to produce a cleartext content;
   returning the cleartext content to a NL7C device;
   comparing the returned cleartext content to a content cache, wherein if the cleartext content is not present in the content cache, the processing further comprises delivering the cleartext content to the web application and producing an outgoing cleartext message based on a response from the web application, and if the cleartext content is present in the content cache, the processing further comprises producing the outgoing cleartext message based on the cleartext content present in the content cache;
   retrieving a SSL context handle from a SSL socket;
   passing the SSL context handle and the outgoing cleartext message to kernel SSL module;
   encrypting the outgoing cleartext message; and
   outputting an encrypted response.

12. The method of claim 11, further comprising:
receiving an indication to close TCP connection in the NL7C device; and
outputting a close-notify message from the NL7C device.

* * * * *